United States Patent
Münzebrock et al.

(10) Patent No.: US 6,837,363 B2
(45) Date of Patent: Jan. 4, 2005

(54) CONTROL DEVICE FOR OVERHEAD CONVEYORS

(75) Inventors: Anton Münzebrock, Dortmund (DE); Etienne Nitidem, Lemgo (DE); Jörg Praczyk, Wetter (DE)

(73) Assignee: Demag Cranes & Components GmbH, Wetter (DE)

( * ) Notice: Subject to any disclaimer, the term of this patent is extended or adjusted under 35 U.S.C. 154(b) by 0 days.

(21) Appl. No.: 10/608,352

(22) Filed: Jun. 27, 2003

(65) Prior Publication Data

US 2004/0007443 A1 Jan. 15, 2004

(30) Foreign Application Priority Data

Jul. 11, 2002 (DE) .......................... 102 31 902

(51) Int. Cl.$^7$ .............................................. B65G 43/00
(52) U.S. Cl. .............................. 198/502.1; 198/502.4; 212/285
(58) Field of Search ........................... 198/502.1, 502.4, 198/465.4, 570, 571; 212/276, 285

(56) References Cited

U.S. PATENT DOCUMENTS

| | | | | |
|---|---|---|---|---|
| 5,749,454 A | * | 5/1998 | Layne ..................... | 198/464.4 |
| 6,439,370 B1 | * | 8/2002 | Hoffman et al. ......... | 198/502.1 |
| 6,446,788 B1 | * | 9/2002 | Leidy et al. ............ | 198/502.4 |
| 6,508,353 B1 | * | 1/2003 | Edstrom .................. | 198/502.3 |

FOREIGN PATENT DOCUMENTS

| | | |
|---|---|---|
| DE | 3706325 | 9/1988 |
| DE | 4108347 | 9/1992 |
| EP | 547280 | 6/1993 |
| EP | 0592795 | 8/1993 |
| EP | 592795 | 4/1994 |

OTHER PUBLICATIONS

European Search Report dated Oct. 13, 2003, from corresponding Patent Application Ser. No. EP 03014636.9.

* cited by examiner

Primary Examiner—James R. Bidwell
(74) Attorney, Agent, or Firm—Van Dyke, Gardner, Linn & Burkhart, LLP

(57) ABSTRACT

A control device for overhead conveyors equipped with at least two actuators (6, 7), specifically crane and crane trolley drive units, with transmission of control signals and transmission of safety signals from control unit (10) to actuators (6, 7) via a signal connection, with a control unit (10) exhibiting a safety switch unit emitting at least one safety signal, which can be triggered manually in order to shut down at least one actuator (6, 7). In order to specify a simple control device ensuring a conveyor's increased operational safety, it is suggested that a signal connection feature serial bi-directional data bus (11) used for signal transmission between control unit (10) and actuators (6, 7), which are therefore equipped with the pertinent controls (12, 13), each operating jointly with a corresponding safety control (14, 15), monitoring independently from each other all of the safety signals transmitted via data bus (11) and emitting at least one shut-down command to at least one of controls (12, 13), when at least one predetermined incident has occurred.

21 Claims, 1 Drawing Sheet

CONTROL DEVICE FOR OVERHEAD CONVEYORS

BACKGROUND OF THE INVENTION

The invention refers to a control device for overhead conveyors equipped with at least two actuators, specifically crane and crane trolley drive units.

For instance, a control device with a hanging control panel for crane and crane trolley drive units of cranes with traversing crane trolleys is known from EP 0 592 795 A1, in which a hanging control panel suspended from a crane is used to control the movement of hoisting gear located on a crane trolley above the operator. The hanging control panel is used to control the up-and-down movement of the hoisting gear. It controls the crane's drive unit and the crane trolley's drive unit simultaneously. For this reason, the hanging control panel is connected to corresponding controls via a control line. The hanging control panel emits control signals, which are transmitted to the control. Aside from control signals, the hanging control panel also generates safety signals, which are initiated manually, for instance an emergency stop of the hoisting gear initiated by the operator. The transmission of control and safety signals occurs via signal lines (conductor or contact lines) running parallel in the form of switch states dependent on certain levels or coded continuously variable signals (PWM code), while at least one line is used for each control and safety signal.

It is further known to transmit control and safety signals via a data bus when conductor lines are used with overhead conveyors with a high number of special functions. A central control is used to control the drives via control signals transmitted by a data bus. Safety signals are transmitted via separate conductor lines independently from control signals as switch states dependent on certain levels.

These known control devices have the disadvantage that they are relatively expensive and that impacts and collisions may occur nonetheless, especially if a hanging control panel, and therefore its emergency stop function, fails.

The purpose of the present invention is to specify a simple control device for overhead conveyors and ensure a conveyor's increased operational safety.

SUMMARY OF THE INVENTION

A control device for an overhead conveyor, according to an aspect of the invention, includes at least one actuator and a control unit. Transmission of control signals and transmission of safety signals from the control unit to the at least one actuator is via a signal connection. The control unit defines a safety switch unit emitting at least one safety signal that can be triggered manually in order to shut down the actuator. The signal connection includes a serial bi-directional data bus used for signal transmission occurs between the control unit and the at least one actuator. The at least one actuator is equipped with an actuator control. A safety control monitors all of the safety signals transmitted via the data bus and emits at least one shut-down command to the actuator control and at least one predetermined incident occurs.

The solution provides that a signal connection exhibit a serial bi-directional data bus, which is used to transmit signals between the control unit and the actuators equipped with corresponding controls, which operate jointly with one respective safety control each, monitoring independently from each other all safety signals transmitted by the data bus and emitting at least one shut-down command to at least one of the controls when at least one predetermined incident occurs. For this reason, only a single bi-directional data bus is required, and all safety signals transmitted via this one data bus are monitored in a decentralized manner. Safety signals may be initiated manually by the operator and passed to the data bus, or the actuators may trigger safety signals on their own, which may lead to an emergency stop after this has been checked by the respective decentralized safety control. Therefore, increased safety during the operation of a conveyor is achieved via a simplified control device.

One simple design provides that the control unit be a hanging switch connected to an electrical control line, and the safety switch unit be its emergency switch.

Increased safety is achieved when safety controls include a safety switch shutting down the pertinent actuator as an incident occurs.

An emergency stop is initiated for basic safety reasons, if one of the predetermined incidents is a failing control unit.

In order to be able to operate the conveyor with increased safety even in the case of control unit failure, it is recommended that the control unit emit an activity signal continuously in predetermined intervals and that if it is absent, the control unit's failure is considered an incident occurred.

One simplified design provides that the safety control be integrated into the control to which it pertains.

Complete safety monitoring is achieved if a safety control also monitors the signals of other conveyor components, specifically sensors of other components relevant to safety.

If the transmission of signals occurs in sections via contact lines, it is recommended that the transmission, which includes the transmission of control signals and the transmission of safety signals, occur in sections via contact lines activated by line drivers, ensuring a timed sequence of data bus signals according to a predetermined protocol. In the case of only one actuator, the task's solution provides that the signal connection exhibit a serial bi-directional data bus through which signal transmission occurs between the control unit and actuator, which is equipped with the pertinent control for this purpose, and that a safety control exists, monitoring all safety signals transmitted via the data bus and emitting at least one shut-down command to the first control, when at least one predetermined incident occurs.

The control unit's functionality can be increased if the control unit is located in a personal computer.

These and other objects, advantages and features of this invention will become apparent upon review of the following specification in conjunction with the drawings.

BRIEF DESCRIPTION OF THE DRAWINGS

The single FIGURE illustrates the control device of a bridge crane according to the invention.

DESCRIPTION OF THE PREFERRED EMBODIMENT

Figure 1:
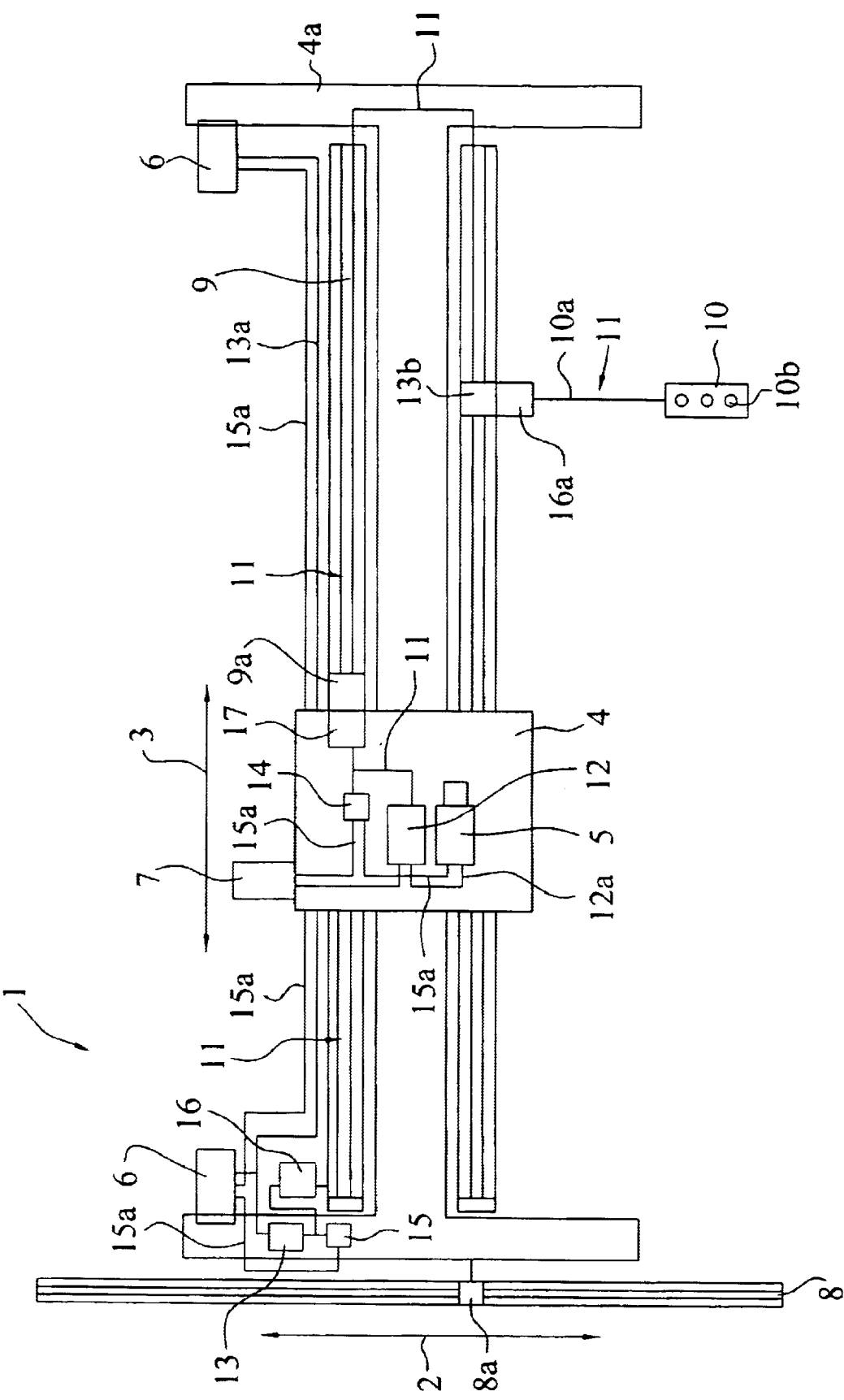

Referring now specifically to the drawings, and the illustrative embodiments depicted therein, the FIGURE shows in a schematic illustration bridge crane 1 with crab 4, which can be moved transversely to the crane's direction of travel 2 in crane trolley's direction of travel 3 in a top view, when located on crane carrier 4a. Crab 4 possesses hoisting gear whose hoisting gear drive 5 is illustrated schematically. Bridge crane 1 is powered by a crane's drive unit 5 and, independently thereof, crab 4 is powered by crane trolley drive unit 7.

Bridge crane 1 is supplied with electric power by means of bundled contact lines 8 and slider 8a sliding on them, while crab 4 is supplied with electric power via bundled conductor lines 9 with slip contact 9a. Bundled contact lines 8, 9 exhibit conductor lines arranged parallel to each other and connected to drives 5, 6, 7, shown in the FIGURE as actuators, via slip contacts 8a, 9a.

In order to move bridge crane 1 with crab 4 and hoisting gear (drive 5), a control device is provided.

The control unit is constructed in a decentralized manner. It includes control unit 10 in form of a hanging control switch unit suspended from electrical control line 10a with buttons 10b. The switch unit is located beneath bridge crane 1 and connected to drive control 12 of crane trolley drive 7 and drive control 13 of crane drive unit 6 via a serial bi-directional data bus 11, while drive control 12 also controls hoisting gear drive 5. The data exchange between drive controls 12 and crane trolley drive unit 7 occurs via separate connection line 12a, and between drive control 13 and crane drive unit 6 via separate connection line 13a. Control unit 10 has electrical contact with the bundled conductor lines via slip contact 13b. In this case, its design is such that it can be moved along the bundled conductor lines, while data bus 11 proceeds via one of the conductor lines. The control signals for drives 5, 6, 7 are transmitted via data bus 11.

In addition, data bus 11 transmits safety signals from control unit 10 to safety controls 14 (of crab 4) and 15 (of bridge crane 1), which can shut down one or more drives 5, 6, 7. An operator may manually initiate a safety signal with control unit 10.

Safety controls 14, 15 monitor independently from each other all safety signals transmitted via data bus 11, i.e., all signals relevant to safety. Safety signals are evaluated autonomously and independently from each other by each safety control 14, 15 and, as a predetermined incident occurs such as, for example, a predetermined signal, a shut-down command is emitted to one, several or all safety controls 14, 15, and the respective drive 5, 6, 7 is shut down.

For this reason, safety controls 14, 15 have, as a safety switch unit, safety switches which are not shown. They link release line 15a to a connected emergency switch, which can be used to stop the entire bridge crane 1.

An activity signal continuously emitted by control unit 10 in predetermined intervals is also part of the safety signals. If this activity signal is missing, for example due to the failure of control unit 10, then this is one of the predetermined incidents for which safety controls 14, 15 each turn off their respective drive 5, 6, 7.

Safety controls 14, 15 are designed such that they may also monitor the signals of other components of bridge crane 1, especially sensors positioned at different locations on crane 1, as for instance those monitoring the temperatures of drives 5, 6, 7.

The transmission of control signals and safety signals occurs largely via conductor lines, while line drivers 16, 16a, 17 are designated to ensure a timed sequence of data bus signals according to a predetermined protocol. Signal transmission via data bus 11 occurs in the form of protocol telegrams.

Of course control unit 10 may also be located in an external personal computer.

Each drive control 12, 13 may also receive predetermined information regarding all of the other controls 12, 13, etc., but also regarding drives 5, 6, 7 and the sensors as well as additional components relevant to safety via data bus 11.

Naturally data bus 11 may also be realized via a radio link instead of electrical control line 10a, in which case control unit 10 is equipped with a sender and a receiver, and another sender and receiver are connected to the top of data bus 11.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A control device for an overhead conveyor, comprising:
at least two actuators;
a control unit transmitting control signals and safety signals to said actuators via a signal connection;
said control unit including a safety switch unit emitting at least one safety signal, which can be initiated manually in order to shut down at least one of said actuators;
a signal connection including a serial bi-directional data bus used for signal transmission between said control unit and said actuators;
actuator controls, each including a corresponding safety control, said safety controls monitoring independently from each other all safety signals transmitted via said data bus and emitting at least one shut-down command to at least one of said actuator controls, when at least one predetermined incident occurs.

2. The control device according to claim 1, wherein said control unit includes a hanging switch unit connected via an electrical control line, and one of said safety controls comprising an emergency switch of said hanging switch unit.

3. The control device according to claim 1, wherein said one of said safety controls includes a safety switch, which shuts down the pertinent actuator as an incident occurs.

4. The control device according to claim 3, wherein one of the predetermined incidents is a failure of said control unit.

5. The control device according to claim 3, wherein said control unit continuously emits at predetermined intervals an activity signal and that if the activity signal is absent, it is considered that an incident that has occurred.

6. The control device according to claim 1, wherein each said safety control is integrated into its corresponding actuator control.

7. The control device according to claim 1, wherein at least one of said safety controls also monitors the signals of additional conveyor components, especially the sensors of other components relevant to safety.

8. The control device according to claim 1, wherein the signal transmission, including transmission of control signals and transmission of safety signals via conductor lines, said conductor lines being activated by line drivers, ensuring the timed sequence of data bus signals according to a predetermined protocol.

9. The control device according to claim 1, wherein said control unit includes a hanging switch unit connected via an electrical control line, and one of said safety controls comprising an emergency switch of said hanging switch unit.

10. The control device according to claim 4, wherein said control unit continuously emits at predetermined intervals an activity signal and that if the activity signal is absent, it is considered that an incident that has occurred.

11. The control device according to claim 1 wherein said at least two actuators comprise crane and trolley drive units.

12. The control device according to claim 1, wherein said control unit is defined by a personal computer.

13. A control device for an overhead conveyor comprising:

at least one actuator;

a control unit for a signal connection;

transmission of control signals and transmission of safety signals from said control unit to said at least one actuator, whereby said control unit defines a safety switch unit to emit at least one safety signal that can be triggered manually in order to shut down the actuator;

said signal connection including a serial bi-directional data bus, through which signal transmission occurs between said control unit and said at least one actuator;

said at least one actuator equipped with an actuator control;

a safety control, monitoring all of the safety signals transmitted via said data bus and emitting at least one shut-down command to said actuator control when at least one predetermined incident occurs.

14. The control device according to claim 13, wherein said control unit includes a hanging switch unit connected via an electrical control line, and one of said safety controls comprising an emergency switch of said hanging switch unit.

15. The control device according to claim 13, wherein said one of said safety controls includes a safety switch, which shuts down the pertinent actuator as an incident occurs.

16. The control device according to claim 15, wherein one of the predetermined incidents is a failure of said control unit.

17. The control device according to claim 15, wherein said control unit continuously emits at predetermined intervals an activity signal and that if the activity signal is absent, it is considered that an incident that has occurred.

18. The control device according to claim 13, wherein each said safety control is integrated into its corresponding actuator control.

19. The control device according to claim 13, wherein at least one of said safety controls also monitors the signals of additional conveyor components, especially the sensors of other components relevant to safety.

20. The control device according to claim 13, wherein the signal transmission, including transmission of control signals and transmission of safety signals via conductor lines, said conductor lines being activated by line drivers, ensuring the timed sequence of data bus signals according to a predetermined protocol.

21. The control device according to claim 13, wherein said control unit is defined by a personal computer.

* * * * *